United States Patent
Hansmann et al.

(10) Patent No.: US 7,650,647 B1
(45) Date of Patent: Jan. 19, 2010

(54) HARDWARE-ORIENTED CONFIGURATION AND LOCKING OF DEVICES

(75) Inventors: Uve Hansmann, Altdorf (DE); Lothar Merk, Weil i Sch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 09/667,010

(22) Filed: Sep. 21, 2000

(30) Foreign Application Priority Data

Sep. 24, 1999 (DE) ................................ 199 45 861

(51) Int. Cl.
*G08B 29/00* (2006.01)
*G06F 12/14* (2006.01)
*H04K 1/00* (2006.01)
*H04L 9/00* (2006.01)

(52) U.S. Cl. ............................. 726/34; 726/16; 726/19; 726/20; 713/153; 713/165; 713/166; 713/172; 713/182; 713/185; 713/189; 380/247; 380/255; 380/28

(58) Field of Classification Search .................. 713/200
See application file for complete search history.

(56) References Cited

U.S. PATENT DOCUMENTS

| | | | | |
|---|---|---|---|---|
| 5,272,747 A * | 12/1993 | Meads | .......................... | 455/407 |
| 5,892,902 A * | 4/1999 | Clark | ............................. | 726/5 |
| 5,933,785 A * | 8/1999 | Tayloe | .......................... | 455/558 |
| 5,949,882 A * | 9/1999 | Angelo | ........................ | 713/185 |
| 6,023,620 A * | 2/2000 | Hansson | ..................... | 455/419 |
| 6,029,065 A * | 2/2000 | Shah | ........................ | 455/414.4 |
| 6,084,968 A * | 7/2000 | Kennedy et al. | ............ | 380/259 |
| 6,088,450 A * | 7/2000 | Davis et al. | .................. | 713/182 |
| 6,167,251 A * | 12/2000 | Segal et al. | .................. | 455/406 |
| 6,415,144 B1 * | 7/2002 | Findikli et al. | .............. | 455/419 |
| 6,898,711 B1 * | 5/2005 | Bauman et al. | ............. | 713/185 |
| 2006/0259769 A1 * | 11/2006 | Goettfert et al. | ............ | 713/168 |
| 2008/0024322 A1 * | 1/2008 | Riemschneider et al. | .... | 340/904 |
| 2008/0046529 A1 * | 2/2008 | Gilhuly et al. | .............. | 709/206 |
| 2008/0052505 A1 * | 2/2008 | Theobald | ........................ | 713/1 |
| 2008/0064367 A1 * | 3/2008 | Nath et al. | .................. | 455/411 |

(Continued)

OTHER PUBLICATIONS

Kulkarni et al. Context-Aware Role-based Access Control in Pervasive Computing Systems, 2008, ACM, pp. 113-122.*

(Continued)

*Primary Examiner*—Ayaz R Sheikh
*Assistant Examiner*—Aravind K Moorthy
(74) *Attorney, Agent, or Firm*—Thomas A. Beck

(57) ABSTRACT

Method and device for setting basic means of access for operation of electronically operated devices (12), with the aid of a possibly transferable personal authentication system (16), essentially based on three components used in the course of the method in accordance with the invention; namely additional device hardware functions permitting means of access, namely in particular for custom configuration and shutdown of the devices; a hardware-oriented interface to a reader device (18) for the authentication system (16) such as a SmartCard reader permitting access to the functions by a SmartCard (16); and the authentication system (16) itself, capable of directly accessing the configuration and/or shutdown/startup/restart functions of the device hardware by way of the defined interface.

Legitimization for configuration/shutdown and startup/restart of the devices is provided by matching of keys stored on the SmartCard (16) and in a ROM (14) in the device (12).

15 Claims, 2 Drawing Sheets

U.S. PATENT DOCUMENTS

2008/0082983 A1* 4/2008 Groetzner et al. ........... 718/105

OTHER PUBLICATIONS

Whittle et al, Executable Misuse Cases for Modeling Security Concerns, 2008, ACM, pp. 121-130.*

Maaser et al, Providing granted rights with anonymous certificates, 2008, IEEE, pp. 890-893.*

Michael Clifford, Networking in the Solar Trust Model: determining optimal trust paths in a decentralized trust network, 2002, IEEE, pp. 271-281.*

* cited by examiner

HARDWARE-ORIENTED CONFIGURATION AND LOCKING OF DEVICES

1. BACKGROUND TO THE INVENTION

1.1 Field of the Invention

The present invention relates to a method and device for setting basic means of access for operation of electronically operated devices, in particular a method and device for configuring and locking devices with the aid of a personal authentication system, in particular with the aid of SmartCards.

1.2 Disadvantages of the State of the Art

The term "device" in the context of the inventive concepts presented here is very broad and generalized. It covers a broad variety of equipment from small mobile phones or other small computer-controlled consumer devices with a certain, relatively low, level of computing power, through actual computers, to larger items of equipment such as motor vehicles, all the way up to control terminals for industrial processes, which may require authentication prior to operation. The prerequisite for all such "devices", however, is that they have an electronic control to operate them—a feature found almost everywhere in today's world.

Custom configuration of devices is a key task in customer-oriented manufacturing processes. The current state of the art applies three basic configuration mechanisms to this end. Firstly, the devices can be configured at the factory to meet the needs of individual customers. The required software is installed in the devices during manufacture. This does, however, require precisely planned production processes with complex production planning systems, which are often not available, and so increases delivery times.

Secondly, configuration of the devices can be delegated to the customers. They can set up their devices by means of an installation disk, for example. However, the additional commitment demanded of the customer for such operations may result in significant competitive disadvantages, since the customer is not thoroughly trained in the programming logic of the devices in question. Furthermore, the procedure entails security issues, in particular where the functions being configured are operationally critical, or where the device manufacturer has to disclose internal information about the product. The distribution of this configuration information cannot be controlled.

Thirdly, many suppliers utilize online links, such as the Internet or the telephone, for custom configuration of devices or of plant comprising several such devices. This is relevant in the case of telephone systems, for example: Modern-day telephones are mostly equipped with the maximum possible functionality, but only the features ordered and paid for by the customer are actually activated. This means the devices can be produced in identical form in large volumes, and do not have to be configured and customized until on-site at the customer's location.

The use of such online links to update the software of installed telephone systems is doubtless the most flexible method at present, but it does require detailed information on the customers and their operational configuration, which is often not available.

Aspects such as protection of the configuration data in the event of resale of the system also need to be considered in this context too, however. These security aspects can only be covered to a limited degree, such as by password protection when logging on to the manufacturer's or service provider's configuration server and when clearing the online link.

The first possibility outlined above is highly complex and cost-intensive for the manufacturer, in particular in relation to low-cost consumer electronics equipment.

In the case of the two latter variants, it can only with some difficulty be ensured that users of the devices are prevented from illicitly using or passing on specific configurations for which they are not authorized.

A feature often closely linked in technical terms to the facility for configuring these devices is the facility for "configuring" them such that they are locked and no longer accessible for normal use.

One possibility offered by the state of the art for locking the hardware of such devices, and thus protecting the devices from misuse or theft, is familiar in relation to mobile phones and PCs.

The methods applied in those devices merely consist of input of a password, however. This results in risk of misuse if the password becomes known. Furthermore, a four-digit code as used in present-day mobile phones, for example, can be very quickly "cracked" with computer assistance.

Moreover, the level of user-friendliness is restricted, because the password can very easily be forgotten.

More complex locking functions which are not so easy to decrypt and which define the cryptographic keys and various roles, such as user, service engineer and system administrator, are not possible in conjunction with the existing methods.

As soon as state-of-the-art devices are equipped with more complex SmartCard-based security features, such applications are implemented in the state of the art as software. For example, the PC operating system Windows 2000 offers holders of a SmartCard associated with the PC the possibility of defining individual access rights to various files and setting up custom configurations. This method is based on the operating system, however, and can be deactivated by deleting the operating system from the hard disk. A potential thief would have unrestricted access to the system after reinstalling the operating system or replacing the hard disk.

Only the user data can be largely protected by the existing method.

1.3 Object of the Invention

The object of the present invention is consequently to create a reliable means of protecting such devices against unauthorized use in such a way that they become unattractive to a thief or any person intent on misuse.

A further object of the invention is to render such devices configurable in a user-friendly and secure way; that is, to make them accessible for individual, customized use by the customer.

2. SUMMARY AND ADVANTAGES OF THE INVENTION

The objects cited are fulfilled by the characteristics set out in the independent Claims. Advantageous enhancements of the invention result from the respective subclaims.

The inventive solution presented here is essentially based on three components for setting up basic means of access, in particular such as to enable temporary shutdown, startup or restarting, and configuration of devices. The components are: additional device hardware functions permitting basic means of access to operate the devices, namely in particular for custom configuration and shutdown of the devices; a hardware-oriented interface to a reader device such as a SmartCard reader permitting access to the said functions by the SmartCard; and the authentication system itself, such as a SmartCard capable of directly accessing the configuration and/or shutdown/startup/restart functions of the device hardware by way of the defined interface.

Legitimization for configuration/shutdown and startup/restart of the devices is preferentially provided by matching of keys stored on the SmartCard and preferentially in a ROM in the device. Alternatively, or in combination therewith, other means of legitimization could also be applied, such as biometric authentication methods. A fingerprint could be stored on the SmartCard, for example, which is then compared against a specimen when the device is reactivated.

The first component cited—the hardware expansion—is device-specific. The processors of PCs, for example, can be upgraded to include such functions, or the BIOS can be updated. In consumer electronics equipment or telephones the functions could be defined in the ROM, or in the firmware. Cryptographic keys must be stored in the devices and used by the SmartCard to authenticate the person authorized to configure, shutdown or restart the devices in question.

The interface between the device and the SmartCard includes a standard SmartCard reader supplemented by a hardware-oriented control, since the software drivers usually used for control purposes are absent in this hardware-oriented invention. In this context, an implementation of the ROM, BIOS or firmware as customized "hardware-cast" software is conceivable in principle. Alternatively, instead of the SmartCard and the SmartCard reader any other so-called Secure Token with an appropriate link to the device could be used, such as the eToken from Aladdin or a JavaRing from Dallas Semiconductor.

The third component cited above—the authentication system—in the form of a SmartCard is doubtless the most flexible of the three components. It can be transferred in an advantageous manner from one person to another as necessary and if so desired, and is open to progressive hierarchies of access rights to the device, for example by the production of a Master SmartCard which can be issued to customers' service personnel in order to configure large numbers of individual devices. In this way, for example, the logic based on which the devices in question must or may be configured, shut down or restarted can be programmed in a highly flexible and individual manner using a SmartCard. This is because a wide variety of information can be stored on the card, such as complete custom firmware updates, device-specific command sequences to execute specific device functions such as to deactivate the processor, cryptographic keys as counterparts to the keys in the device with which an individual authentication procedure can be executed, such as public key/private key procedures, cryptographic algorithms and individual decision-making logic, and where appropriate keys authorizing the customer to download additional configuration data or software components from a manufacturer's server, as well as the required data to establish the link (e.g. telephone number or IP address).

Applying the method in accordance with the invention, and based on the stipulation that a single SmartCard is to be able to configure any number of devices but that only a Master SmartCard or a personal SmartCard can be used to shut down and/or startup/restart the devices, a device manufacturer may do the following:

A device is manufactured in large volumes in identical form. Each device contains cryptographic keys which are burnt into the ROM and are suitable for handling authentication protocols. These identical devices ("white devices") can then be placed in storage. When an order is received from a customer the "white devices" are retrieved from storage and, for each device, a SmartCard is produced containing the configuration data according to the customer's order specifications. This SmartCard is sent to the customer separately from the device, and in practical terms is the customer's counterpart key matching the keys in the device. Each device can thus be started up and shut down with the manufacturer's matching SmartCard and/or Master SmartCard, but can only be configured with the manufacturer's Master SmartCard. This can be ensured by means of cryptographic algorithms on the SmartCard, such as asymmetrical authentication with public and private key and RSA algorithms and hardware-oriented functions on the device side.

If the necessary configuration data are too extensive to be stored in full on a SmartCard, as is conceivable in the case of a PC for example, the customer can connect the device to a network linked to the manufacturer, or to a telephone line, and use the SmartCard to authorize access to a manufacturer's configuration server. Basic network access and download software is required for this. The device features ordered by the customer are then activated by way of the SmartCard, and the device can download missing or updated software components as required via the network connection or telephone line.

The user can then use the SmartCard to deactivate the hardware and so shut down and lock the device in an advantageous manner at any time. In this way the device is ideally protected against theft or misuse by third parties when the user is absent. It is impossible to forget a password, as none is used.

For secure locking, unique keys in terms of a serial number—such as symmetrical authentication with DES algorithms—must additionally be permanently stored on each individual device, for example in the ROM. A specific standard SmartCard can only activate or shut down the one device allocated to it.

A further resultant advantage for the manufacturer of a device is that it can ensure by means of cryptographic keys that customers are able to use only the configuration for which they are authorized. The possibility of misuse of configuration data by unauthorized distribution is practically excluded, since the link between the data and the security key means the data do not match any other system.

This produces substantially improved security features for device configuration and shutdown in relation to conventional authorization/authentication by means of a PIN.

Furthermore, custom settings which users can utilize in a highly individual manner, and offline, to configure their devices can be stored on the SmartCard.

Customers are able to deactivate their devices, such as for lengthy vacation breaks, and so render their equipment unattractive to thieves as a result of this "electronic immobilizer". The device remains inoperable until the bar is lifted with the same card or with a manufacturer's backup card.

A fundamental element of the method in accordance with the invention is that it is based directly on hardware and controlled at the BIOS level, and so no security gaps can occur in any intermediate software layers. Since the complex decision-making logic as to which configuration and access rights are to be applied is stored on the SmartCard, it is possible to implement these device-side setups with a relatively low level of effort and expense.

As a result of its hardware orientation, the method is advantageously independent of the software, drivers and operating systems ultimately installed in the device.

Lastly, this method provides manufacturers with an advantageous means of protecting their investment, as they need not disclose any configuration information and can rest assured that the device can be used only to the extent agreed with the customer and documented on the SmartCard.

In production of the devices, custom configuration requirements need no longer be met. All devices can be produced identically, thereby simplifying the production process and cutting costs. Delivery times are also shortened, since the devices can be produced to stock and when orders are received for a specific configuration only the SmartCard need be customized. When a device is shipped to a customer, a SmartCard is produced containing the configuration and features required by the customer and is sent along with the device.

Devices with network connections can download the latest software to update their operating programs the first time they are activated.

The method in accordance with the invention provides the customer with anti-theft protection: There is no point in stealing the device in transit or during operation, as it is valueless without the SmartCard.

Ultimately, handling of the configuration process is much simplified.

Applications of this method are presented in the following as examples only:

Anti-theft protection for PCs: With the aid of the SmartCard the computer hardware can be locked against use when the authorized user is absent. The computer is then inoperable until the bar is lifted with the same card or with a manufacturer's backup card. The method offers optimum protection by implementing the computer-side element directly in the processor.

Advantages are also seen in terms of servicing of the PC: If a conventional hardware password is set it must be disclosed to the service engineers. On the other hand, if no password is used the system is inadequately protected.

If the hardware password is protected by SmartCards as proposed by the invention, it is possible to grant specific groups of personnel specific levels of access: full access for the owner and service access without disk access for the manufacturer's service engineer, for example.

The method is thus much more efficient, user-friendly, flexible and secure than use of the conventional hardware password.

A further preferred area of application is configuration management for telephones.

Telephones and other electronic devices manufactured in large volumes for different markets must be configured for the individual target groups or customers, for example in terms of language setting, encryption procedure, country-specific protocols and scope of functions, as mentioned above.

The hardware-oriented use of the SmartCard opens up new flexible means of configuration, similar to those described above, which are especially attractive to private consumers with small numbers of devices, because then all the configuration data can be stored directly on the SmartCard.

Equipment leasing and rental agreements can also be enhanced by the invention if user authorization can be controlled by SmartCard.

Devices with network connections can be shipped with the base software required for network access. In the configuration process the device then downloads the latest software modules from a central server.

The devices mentioned, or their configurations, can be additionally protected by storing one or more personal passwords for one or more specific users on the SmartCard.

This provides an initial guard against misuse of the device even if the SmartCard is lost, since an unauthorized person finding the SmartCard does not know the password(s).

3. DRAWINGS

4. DETAILED DESCRIPTION OF THE EMBODIMENT OF THE INVENTION

Figure 1:
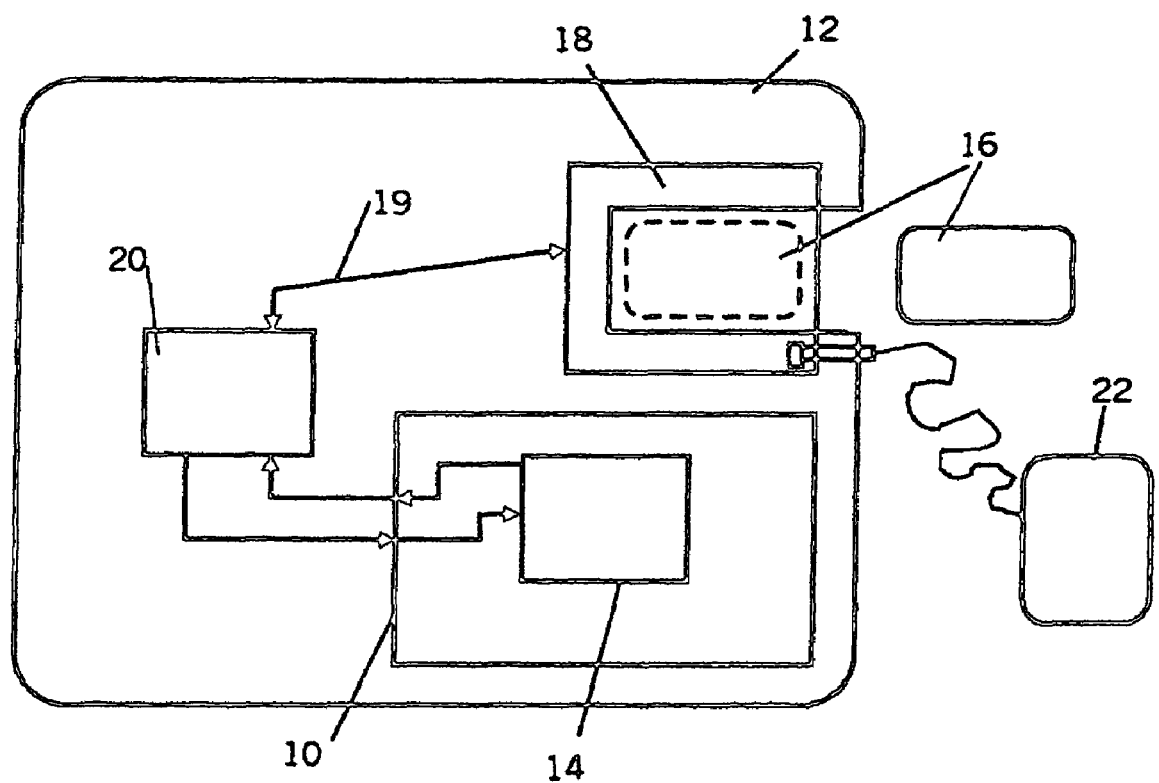
FIG. 1 shows a schematic block diagram of a device in the form of a notebook which can be locked to guard against unauthorized use by means of the method and device in accordance with the present invention.

FIG. 1 shows the BIOS ROM 14 as part of the motherboard 10 of a notebook 12, which is considered as the key assembly of the notebook to be protected by the inventive concept in relation to peripherals. In accordance with the invention a lengthy password used to authenticate the legitimate user is stored in the BIOS or, alternatively for example, in the processor itself. The counterpart to the key is stored on a SmartCard 16 which is readable by means of a SmartCard reader 18 inserted between the BIOS and the SmartCard. The SmartCard interworks with a user authentication program provided in the BIOS of the device in accordance with the invention by way of an agreed protocol, e.g. ISO 7816-4 conforming APDUs for SmartCards as the common interface. In this way, commands and data can be exchanged between the BIOS program and the SmartCard and, depending on the mode of implementation, follow-up commands can be triggered enabling further actions beyond mere token identification or—where appropriate—user identification and enabling or shutdown of the device. This hardware-oriented authentication program thus represents a hardware expansion 20 in the form of a hardware control which controls the operation or specific operating modes of devices. A selection of basic access options for the user ID held on the SmartCard are preferentially stored, and can be enabled following authentication.

When the user tries to start the notebook 12, the authentication program stored in the BIOS 14 is launched and prompts the user to insert a matching SmartCard 16 in the reader 18. The invention then stipulates that a link 19 is established between the SmartCard and the hardware expansion 20, incorporating the BIOS ROM 14.

This link should be seen as permanently wired in physical terms and logically "secure" in terms of bypassing, forgery or disabling of the authentication check. This link is thus established in a highly advantageous manner as a purely hardware implementation, avoiding any intermediate software such as a device driver for the SmartCard reader 18.

Then the program prompts for input of a user ID and associated password. The legitimate user knows this information and enters it using the notebook's keyboard. If the two expressions are entered incorrectly the action is repeated and is finally aborted after a preset number of failed attempts, e.g. after three attempted inputs.

After correct input the program checks in the BIOS whether the key in the BIOS matches the key on the SmartCard. The keys can be created and cross-checked in accordance with common, recognized mechanisms, e.g. the public key/private key method. If the keys match, the BIOS program permits the user access to the basic functions stored on the card as "permitted" for the user in question.

In this case the BIOS sends a signal to the processor (which in the broadest sense can be seen as the electronic device control mentioned at the beginning) to enable operation of the notebook, and then boots it.

If the keys do not match, the computer is not started. The computer can then only be started by inserting the SmartCard with the correct key on it. Otherwise it is inoperable, since it could only be isolated from the security mechanism by replacing the entire motherboard 10.

This represents substantial progress in relation to the current state of the art, in which an unauthorized person can gain access to the computer merely by reinstalling the operating system or disconnecting and reinserting the computer's battery. Consequently, a computer protected in this way is less subject to the risk of theft than computers representing the state of the art.

A palmtop device 22 or similar could also be connected to appropriate ports on the notebook instead of the SmartCard in order to execute the same functions as those of the said SmartCard, and possibly additional functions according to the designated purpose of the device 12.

Figure 2:
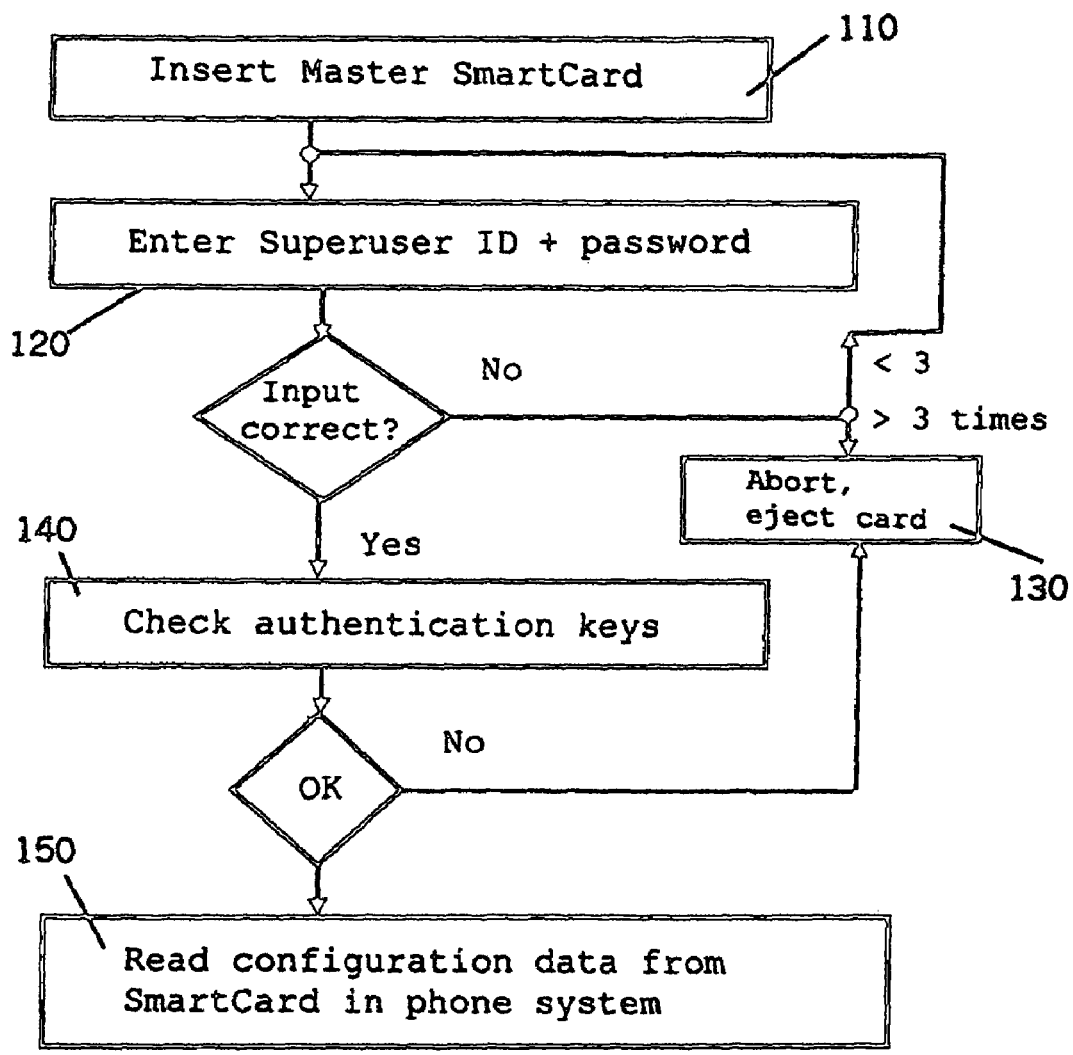
FIG. 2 shows the control flow in a user-friendly and secure configuration of a group of devices, namely a telephone system, installed at a company.

In connection with FIG. 2 there now follows a description of an especially preferred feature in which, utilizing the concepts revealed by the invention, a variety of actions can also be initiated by the SmartCard itself which can be utilized, among other uses, to provide user-friendly configuration of devices.

A company telephone system consists of 20 telephones hierarchically grouped into three levels, with corresponding scopes of functions. The telephone sets themselves are produced uniformly and are assigned their actual features only by means of the configuration procedure, which enables or disables various logic components in the sets depending on the customer's specific requirements. The telephone system manufacturer supplies with the system a SmartCard which is designed as the Master SmartCard and initiates the said configuration procedure when inserted—step 110—into an appropriate interface device, a SmartCard reader of which the output is connected to the telephone system.

Then, as described above in connection with FIG. 1, the program prompts for input of a Superuser ID and associated password. This is an optional step, since the personal identification key stored on the SmartCard is in itself adequate to identify the card as a Master SmartCard. The legitimate user knows the Superuser ID and associated password and enters them using the keypad of one of the telephones in the telephone system—step 120. If the two expressions are entered incorrectly the action is repeated and is finally aborted after a preset number of failed attempts, e.g. after three attempted inputs—step 130.

After correct input an authentication program in a ROM on the telephone's chip checks whether the key in the ROM matches the key on the SmartCard—step 140. The keys can be created and cross-checked as outlined above in accordance with common, recognized mechanisms, e.g. the public key/private key method. If the keys match, the program in the telephone's ROM enables the functions necessary to configure the telephone system.

All the data necessary to initialize, configure and customize the individual telephone sets in the system are now stored on the SmartCard. The data can consequently be written by an executable program stored on the card to memory locations provided in the telephone system—step 150. There is also a program on the SmartCard containing the configuration procedure. The entire system can thus be configured with the appropriate features.

If the keys do not match, the procedure is aborted and no configuration can take place—see diversion to step 130.

In an especially preferred manner, and as an expansion of the embodiment of the invention described in FIG. 2, the method in accordance with the invention for configuring devices with SmartCards is also suitable for performing configurations requiring substantially more configuration data than would fit on a SmartCard. The invention in such cases proposes that a command is sent by the SmartCard establishing a link, such as a TCP/IP connection, to a data pool containing the said configuration data. In the case of a telephone system this may usefully be a data link via the telephone line itself, in other cases depending on the device being configured an e-mail or TCP/IP connection may be most practical. In most cases the data pool is the hard disk of a computer functioning as a server.

The concept in accordance with the invention is also suitable for shutting down devices temporarily, such as during a vacation absence, and thus providing protection against misuse: The SmartCard can send a signal to the device to shut it down, instructing the device to accept and process no further commands apart from a "wake-up" command. This effectively utilizes the capability of SmartCards to define objects in highly variable form and to assign to them specific methods as commands to be executed.

By application of the method in accordance with the present invention, production processes for devices can be much simplified, costs of warehousing cut, and distribution logistics to retailers and consumers simplified, because the devices can be manufactured, stored and distributed in a single design form. Moreover, the requirements in terms of external anti-theft protection are reduced, because the devices are largely useless without the associated SmartCard. This is a major step forward relative to the current method of protection against misuse by input of a password.

Other actions which can be autonomously initiated without the knowledge of the user by means of an appropriate applet on the SmartCard in the event of unauthorized accessing of the device include, for example, sending an e-mail to a preset address or sending a specific alarm signal (ping) to a competent person within the company, provided the device is connected to a network.

Furthermore, the object of the present invention can be realized in hardware, in software, or in a combination of the two. Any kinds of computer system or computer devices are suitable to execute the method in accordance with the invention in whole or in part. A feasible hardware/software combination would be a standard computer with a computer program which—when loaded and run—controls the computer such that it executes the method in accordance with the invention in whole or in part.

The present invention may also be embedded in a computer program product which contains all the features permitting implementation of the methods described herein, and which—when loaded into a computer system—is capable of executing the said methods.

"Computer program systems" and "computer programs" in the present context refer to any expressions in any language or notation or in any code of a set of instructions designed to cause a system with information processing capability to execute one of the following functions either directly or consecutively, or both of the following functions:

a) Translate into a different language or notation or a different code b) Reproduce in a different material form.

It is apparent that the actions which can be initiated by the SmartCard may vary greatly from device to device, and must be adapted to the various purposes of locking in respect of temporary shutdown or configuration of the devices concerned.

The invention claimed is:

1. A method for setting basic means of access for operation of devices of which the operation is controllable by electronic means, comprising: said devices comprising mobile phones, small computer-controlled consumer devices with relatively low level of computing power, computers, motor vehicles, control terminals for industrial processes, all of which devices may require authentication prior to operation, said authentication comprising a temporary deactivation which adds authorization patterns of progressive hierarchies of access rights to said devices prior to said operation;

establishment of a link between a personal authentication system supplied with encryption data and a logic system able to control an electronic device control, said encryption data being stored solely in said authentication system;

said link between said authentication system and said device being via wired or wireless means;

checking said encryption data in said authentication system prior to operation of said electronic device control;

assignment of a plurality of predetermined means of access to said electronic device control associated with said authentication system, said predetermined means providing access to physical hardware resources and access to different software functions, based on the privileges of the user who identified himself to the system, said software function evaluates a security token and is running on top of said physical hardware, said predetermined means of access being dependent upon the level of authorization that is set in said personal authorization system; enabling of said predetermined means for access for said authentication system dependent on the result of said check;

said method providing means for protecting said devices against unauthorized access by rendering said devices configurable in a user friendly and secure way making them accessible for an individual, customized use by a person.

2. The method defined in claim 1, wherein said basic means of access to functions of said device comprise at least one of the following means: disable operation of said devices, enable operation of said devices, or enable configuration of said devices.

3. The method defined in claim 2 wherein said link is made without need for intermediate software layers.

4. The method defined in claim 3 includes in addition, the step of reading at least one of the following features embodied within said authentication system: firmware programs, device-specific command sequences for execution of specific device-specific functions, cryptographic keys, cryptographic algorithms, and individual decision-making logic.

5. The method defined in claim 4 which includes configuration of said devices; by authorized persons, wherein after successful authentication, device-specific configuration data are downloaded into said devices from said authentication system in accordance with said authentication systems or over a network.

6. A device comprising the elements defined in claim 5 for execution setting basic means of access for operations.

7. An authentication system, created for authentication of a person or a group of people, comprising the elements defined in claim 5.

8. The authentication system defined in claim 7 which is implemented in the form of a Smartcard.

9. A system for setting basic means of access for operation of devices of which the operation is controllable by electronic means, including at least one device and an authentication system as defined in claim 8.

10. A computer program, containing program code areas for the execution or preparation for execution of the steps of the method in accordance with claim 4, when said program is installed in a computer.

11. A method for setting basic means of access for operation of devices of which the operation is controllable by electronic means, comprising: said devices comprising small computer-controlled consumer devices with relatively low level of computing power, computers, motor vehicles, control terminals for industrial processes, all of which devices may require authentication prior to operation said authentication comprising temporary deactivation which adds authorization patterns of progressive hierarchies of access rights to said devices prior to said operation; establishment of a link between a personal authentication system supplied with encryption data and a logic system able to control an electronic device control, said encryption data being stored solely in said authentication system; checking said encryption data in said authentication system prior to operation of said electronic device control;

assignment of a plurality of predetermined means of access to said electronic device control associated with said authentication system; said predetermined means providing access to physical hardware resources and access to different software functions, based on the privileges of the user who identified himself to the system, said software function evaluates a security token and is running on top of said physical hardware, said predetermined means of access being dependent upon the level of authorization that is set in said personal authorization system;

enabling of said means for access predetermined for said authentication system dependent on the result of said check;

said method providing means for protecting said devices against unauthorized access by rendering said devices configurable in a user friendly and secure way making them accessible for an individual, customized use by a person.

12. A method comprising: setting basic electronic means of access for operation of devices, said basic electronic means selected from the group consisting of disable operation of said devices, enable operation of said devices, and enable configuration of said devices; said operation being controllable by electronic means, said devices comprising mobile phones, small computer-controlled consumer devices with relatively low level of computing power, computers, motor vehicles, control terminals for industrial processes, all of which devices may require authentication prior to operation, said authentication comprising a temporary deactivation which adds authorization patterns of progressive hierarchies of access rights to said devices prior to said operation;

establishment of a link between a personal authentication system comprising a Smartcard supplied with encryption data and a logic system able to control an electronic device control, said link being made without need for intermediate software layers; and said encryption data being stored solely in said authentication system;

reading at least one of the following features embodied within said authentication system: firmware programs, device-specific command sequences for execution of specific device-specific functions, cryptographic keys, cryptographic algorithms, and individual decision-making logic; and checking said encryption data in said authentication system prior to operation of said electronic device control;

configuring said devices by authorized persons, wherein after successful authentication, device-specific configuration data are downloaded into said devices from said authentication system in accordance with said authentication systems or over a network assignment of a plurality of predetermined means of access to said electronic device control associated with said authentication system, said predetermined means providing access to physical hardware resources and access to different software functions, based on the privileges of the user who identified himself to the system, said software function evaluates a security token and is running on top of said physical hardware, said predetermined means of access being dependent upon the level of authorization that is set in said personal authorization system; enabling of said predetermined means for access for said authentication system dependent on the result of said check;

said method providing means for protecting said devices against unauthorized access by rendering said devices configurable in a user friendly and secure way making them accessible for an individual, customized use by a person;

wherein said basic means of access to functions of said device comprise at least one of the following means: disable operation of said devices, enable operation of said devices, or enable configuration of said devices.

13. A device comprising the elements defined in claim 12 for execution setting basic means of access for operations.

14. An authentication system, created for authentication of a person or a group of people, comprising the elements defined in claim 12.

15. A computer program, containing program code areas for the execution or preparation for execution of the steps of the method in accordance with claim 12, when said program is installed in a computer.

* * * * *

UNITED STATES PATENT AND TRADEMARK OFFICE
CERTIFICATE OF CORRECTION

PATENT NO. : 7,650,647 B1  Page 1 of 1
APPLICATION NO. : 09/667010
DATED : January 19, 2010
INVENTOR(S) : Hansmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1219 days.

Signed and Sealed this

Twenty-third Day of November, 2010

David J. Kappos
*Director of the United States Patent and Trademark Office*